US011669738B2

(12) United States Patent
Zucker et al.

(10) Patent No.: US 11,669,738 B2
(45) Date of Patent: *Jun. 6, 2023

(54) CONTEXT-AIDED MACHINE VISION (71) Applicant: NCR Corporation, Atlanta, GA (US)

(72) Inventors: Brent Vance Zucker, Roswell, GA (US); Adam Justin Lieberman, Suwanee, GA (US)

(73) Assignee: NCR Corporation, Atlanta, GA (US)

( * ) Notice: Subject to any disclaimer, the term of this patent is extended or adjusted under 35 U.S.C. 154(b) by 171 days.

This patent is subject to a terminal disclaimer.

(21) Appl. No.: 17/170,158

(22) Filed: Feb. 8, 2021

(65) Prior Publication Data
US 2021/0166023 A1 Jun. 3, 2021

Related U.S. Application Data (63) Continuation of application No. 16/144,337, filed on Sep. 27, 2018, now Pat. No. 10,984,239.

(51) Int. Cl.
*G06V 20/52* (2022.01)
*G06N 3/08* (2023.01)
*G06T 7/10* (2017.01)
*G06V 20/10* (2022.01)
*G06V 20/64* (2022.01)
*G06N 3/047* (2023.01)
*G06V 10/70* (2022.01)
*G06V 40/10* (2022.01)

(52) U.S. Cl.
CPC ............... *G06N 3/08* (2013.01); *G06N 3/047* (2023.01); *G06T 7/10* (2017.01); *G06V 10/768* (2022.01); *G06V 20/10* (2022.01); *G06V 20/52* (2022.01); *G06V 20/64* (2022.01); *G06V 40/103* (2022.01); *G06T 2207/20132* (2013.01)

(58) Field of Classification Search
CPC ...... G06V 20/10; G06V 20/64; G06V 10/768; G06V 20/52; G06V 40/103; G06N 3/0472; G06N 3/08; G06N 7/005; G06N 3/0454; G06T 7/10; G06T 2207/20132
See application file for complete search history.

(56) References Cited

U.S. PATENT DOCUMENTS 10,984,239 B2 * 4/2021 Zucker .................. G06N 7/005

* cited by examiner

*Primary Examiner* — Phuoc Tran
(74) *Attorney, Agent, or Firm* — Schwegman Lundberg & Woessner, P.A.

(57) ABSTRACT

Various embodiments herein each include at least one of systems, methods, software, and data structures for context-aided machine vision. For example, one method embodiment includes identifying a customer in a shopping area and maintaining an item bin in a computing system of data identifying items the customer has picked up for purchase. This method further includes receiving an image of the customer holding an item and performing item identification processing on the image to identify the item the customer is holding. The item identification processing may be performed based in part on a stored shopping history of the customer indicating items the customer is more likely to purchase. The identified item is then added to the item bin of the customer.

16 Claims, 6 Drawing Sheets

CONTEXT-AIDED MACHINE VISION

CROSS-REFERENCE TO RELATED APPLICATION

This application is a continuation of U.S. patent application Ser. No. 16/144,337, filed Sep. 27, 2018, which application and publication are incorporated herein by reference in their entirety.

BACKGROUND INFORMATION

Electronic imaging has proliferated in recent years. However, use of electronic images is limited to what is actually captured within the data of an image. These limits can lead to poor, low quality programmatic decision making or even prevent such decisions from being made.

SUMMARY

Various embodiments herein each include at least one of systems, methods, software, and data structures for context-aided machine vision example, one method embodiment includes identifying a customer in a shopping area and maintaining an item bin in a computing system of data identifying items the customer has picked up for purchase. This method further includes receiving an image of the customer holding an item and performing item identification processing on the image to identify the item the customer is holding. The item identification processing may be performed based in part on a stored shopping history of the customer indicating items the customer is more likely to purchase. The identified item is then added to the item bin of the customer.

Another method embodiment includes receiving an output from an image processing function that operates to identify an item possessed by an identified individual in a processed image. The received output may include an identifier of the individual, identifiers of each of a plurality of items, and a probability of an item of each respective item identifier matching the item possessed by the individual. The method proceeds by processing each item identifier of the received output to determine a respective weight to be combined with the probability of the item matching the item possessed by the individual. Each respective weight in some such embodiments may be determined based on at least one non-image data models. The method may then combine the determined weights with respective probabilities to declare an item identifier as the most likely match to the item possessed by the individual. An item identifier of the item possessed by the individual may then be added to an item bin data structure.

A further embodiment is in the form of a system that includes a computer processor, a memory device, and instructions stored on the memory device that are executable by the computer processor to perform data processing activities. The data processing activities may include one or more of the methods described above or others as described herein and below.

DETAILED DESCRIPTION

Various embodiments herein each include at least one of systems, methods, software, and data structures for context-aided machine vision. Machine and deep learning models are great at classifying items when there is a clear image with little obstruction. However, it is not always the case where a clear image free of obstruction in a retail setting can be obtained. Shoppers hold items and cover labels, people move out of view of the camera, shoppers block each other, camera angles are just a bit off, and the like. This all makes "seeing" or imaging an item in a shopper's hand difficult and can pose difficulties for item recognition models in a frictionless retail shopping environment. For instance, a deep learning model might process an image with a can of soda that happens to be of a first brand, but an item recognition model may misidentify it as a second brand if the shopper is covering up the label slightly, such as by the way it is being held. Various embodiments herein combat these challenges by augmenting machine item recognition decision making with not image data that provides context. For example, some embodiments utilize a log of historical shopper activity in combination with predictive image recognition modeling. In such an instance, a shopper may be identified and tracked throughout a retail store and items this particular shopper has bought in the past are known. Thus, such embodiments may include computing a conditional probability that the particular shopper has picked up a particular item. At the same time, if the particular shopper has not previously purchased an item that has been predicted by a deep learning model but the item is of a certain class of items that the shopper has purchased, then there may be a factor or weight added taking into account a low chance the predicted item would be bought by them. However, when the predicted item is an item the shopper has purchased on many visits, then it is known there is a high conditional probability for the predicted by a deep learning model and that is factored into the identification decision.

Other information may also, or alternatively, be taken into account, even for shoppers without shopping history. For example, location data of products may be represented in stored data and as a location within a store where an image being processed is captured is also known. In such instances, a predicted product in an image may have the product location and the image location matched up to determine if the locations have a probability of matching and perhaps even a degree of matching. This information may then be factored into the item identification decision as a probability factor, a Boolean operator indicating whether it is even a possibility for the predicted product to be accurate, and the like.

Such contextual data and processing is utilized in the various embodiments herein to improve machine item identification predictions through use of contextual data.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

At a high-level, some of the embodiments herein include identifying and tracking customers as they move though a retail store via a machine vision system, identifying when a customer pickups up an item for purchase, capturing an image frame from a stream of images/video, and isolating the item therein. A model-based item identification process may then predict what the item is, which may include more than one prediction, each with a probability or score. Next, contextual data is considered to confirm or augment the identification probabilities or scores and an identification is made.

With regard to identifying and tracking customers, various embodiments herein capture images from one or more video streams of a store area and utilize artificial intelligence and machine learning algorithms to identify people in the images as being a store employee or a shopper and even an identity of the shopper. Some embodiments further include tracking movement of the people within the store. The tracked movement can provide information that is useful to operators of the store, such as where store employees are, how long they have been in certain areas of the store, which areas of the store need more employees, where most shoppers are concentrated within the store, which areas of the store are popular, and so forth. The system and method can provide instructions to employees on mobile devices or kiosks, in response to the employee locations and activity in the store area. The system and method can also log the movement information, for downstream use. But more importantly for the embodiments herein, identity and location data may be utilized to provide context to improve product identification.

Figure 1:
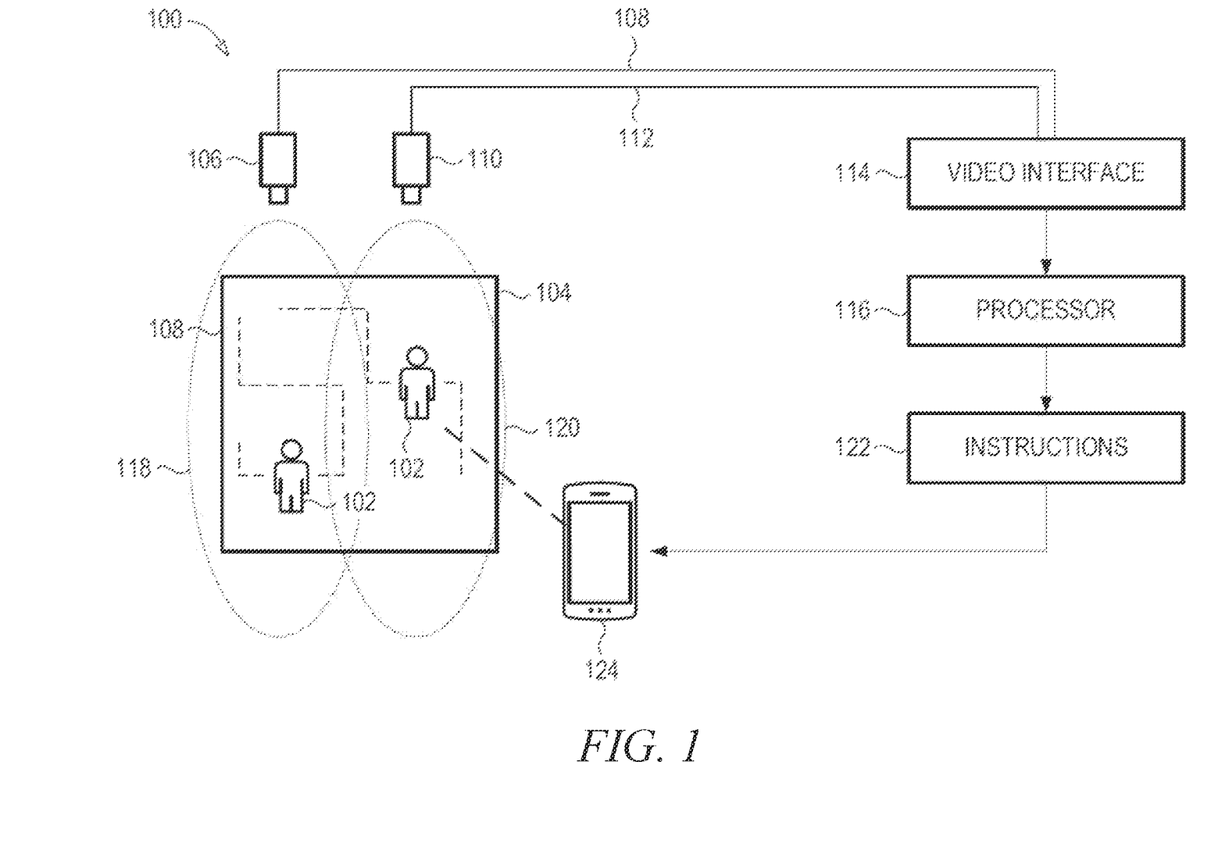
FIG. 1 shows an example of a system 100 that can track the movement of people 102 within a confined area 104, such as a store, and identify products that are picked by customers for purchase in accordance with some examples.

FIG. 1 shows an example of a system 100 that can track the movement of people 102 within a confined area 104, such as a store, and identify products that are picked by customers for purchase in accordance with some examples. The configuration of FIG. 1 is but one example; other suitable configurations can also be used.

A video camera 106 can be positioned to capture a video stream 108 of a confined area 104, such as the shopping area of a store. In some examples, an optional second video camera 110 can be positioned to capture an optional second video stream 112 of at least a portion of the confined area 104. In some examples, the fields of view 118, 120 of the cameras can overlap in at least a portion of the confined area 104. In other examples, the fields of view may not overlap. In some examples, the video streams from the cameras can be processed downstream in a manner such that the cameras need not be explicitly aligned or registered to each other, such as by providing spatial (x, y, z) coordinates of the cameras. Eliminating the alignment of the cameras to each other is a benefit of the manner in which the video streams are processed. In some examples, there can be more than two cameras, each producing a corresponding video stream of at least a portion of the confined area 104.

A video interface 114 can receive the video stream 104, the optional second video stream 112, and any optional additional streams from optional additional cameras. In some examples, the video interface 114 can be a stand-alone piece of hardware, coupled to additional processors and networks as needed. In other examples, the video interface can include one or more dedicated cards in a computer or server. In still other examples, the video interface can be realized entirely in software and coupled to the processor, discussed below.

A processor 116 can be coupled to the video interface 114. The processor 116 can include one or more processors in a machine running locally (e.g., in the store), and/or one or more processors in a server at a remote location and connected to a server in the store through suitable network connections. The processor 116 can execute computing instructions to perform data processing activities. The data processing activities can include operations that pertain to processing of the video stream 108, the optional second video stream 112, and any optional additional streams from optional additional cameras. Examples of such operations are explained further below in the context of the other figures.

Figure 2:
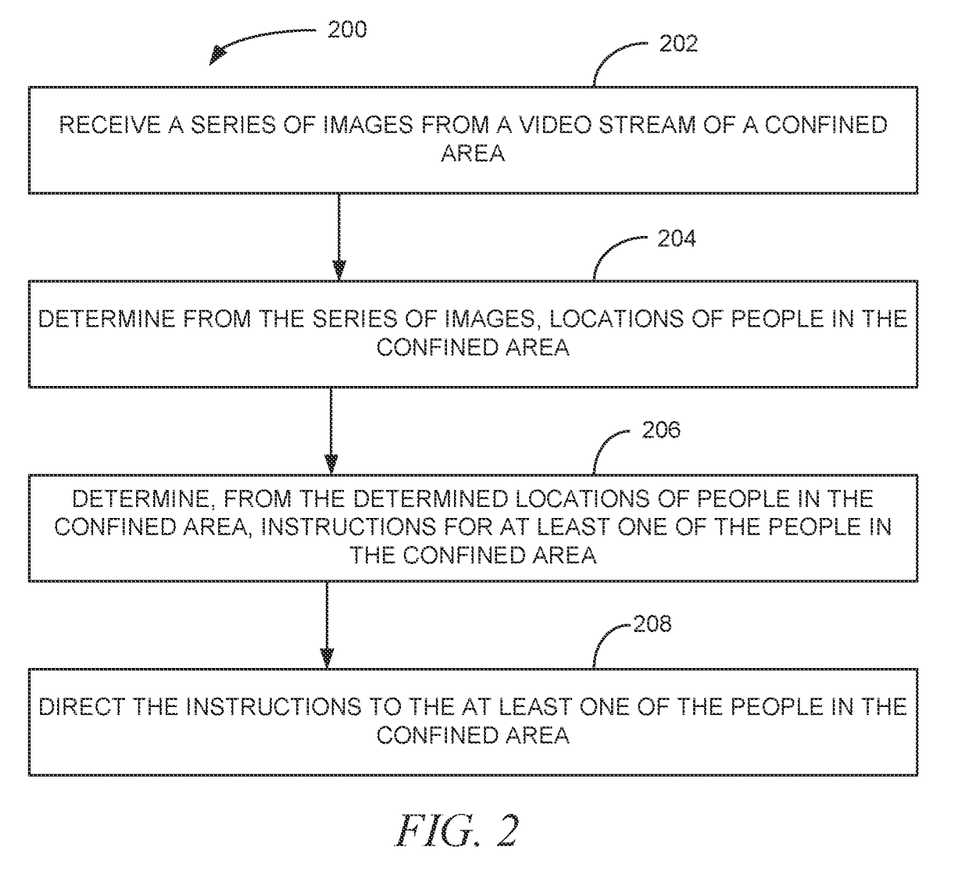
FIG. 2 is a block flow diagram of a method for tracking movement of people within a confined area, such as a store, according to an example embodiment.

FIG. 2 illustrates a flowchart of an example of a method 200 for tracking the movement of people within a confined area, such as a store, in accordance with some examples. The method 200 of FIG. 2 can be executed by the system 100 of FIG. 1, or any other suitable system. The method 200 of FIG. 2 is but one example of a method for tracking the movement of people within a confined area; other suitable methods can also be used. As explained above, the processor coupled to the video interface can execute computing instructions to perform data processing activities. The data processing activities can include the operations shown in FIG. 2 and discussed below.

At operation 202, the system can receive a series of images from a video stream of a confined area, such as a shopping area of a store.

At operation 204, the system can determine, from the series of images, locations of people in the confined area. In some examples, the processor can use a first convolutional neural network to determine the locations of the people in the confined area.

At operation 206, the system can determine, from the determined locations of people in the confined area, instructions for at least one of the people in the confined area. In some examples, the instructions can include a request to attend to an area of the store that requires more store clerks. Such an instruction may be deemed needed when a machine product identification, as described further below, is not possible for some reason.

At operation 208, the system can direct the instructions to the at least of one of the people in the confined area. In some examples, directing the instructions can include sending a message to an employee's smart phone. In other examples, the instructions can include displaying an alert to a kiosk.

In some examples, the system can automatically determine, from the series of images, whether each person in the confined area is a shopper or an employee of the store, based on clothing worn by the person. For example, if the system determines that the person is wearing a shirt having a specified color and style, the system can decide that the person is a store employee. Other examples are possible, such as being positioned in a specific entrance area (such as an employee entrance), wearing some sort of identification authentication when the person enters an area, standing at a QR code or other visual index, checking in with an identification badge, and so forth.

In some examples, the processor of the system can use a second convolutional neural network to analyze the clothing worn by each person to automatically determine if the person is a shopper or an employee of the store. In some examples, the second convolutional neural network can compute a graham matrix for each person to determine whether the person is a shopper or an employee of the store. In some examples, the graham matrix can include a two-dimensional vector of confidence values, the two-dimensional vector having a supremum, the supremum having an index in the two-dimensional vector, the index indicating whether the person is a shopper or an employee of the store.

In some examples, the system can track the movement of people over time. In some examples, the system can improve on a known way of tracking people. For example, whereas a known deep SORT technique creates a person identification when the Kalman filter correctly predicts a location of a person, and deletes the person identification when the person has not been tracked for a specified number of frames, the present system can instead operate on a principle that people enter the confined area at a particular location, exit the confined area at a particular location, and remain within the confined area between those two events. In some examples, the system can log people as entries in a database, such that an entry is created when a person is first detected within the confined area, and the entry is deleted when the person is determined to be absent from the confined area. In some examples, the system can create entries only for one or more specified entry areas within the confined area, and delete entries only for one or more specified exit areas within the confined area. The specified entry and exit areas can be separate areas in the confined area, or a single area in the confined area.

Figure 3:
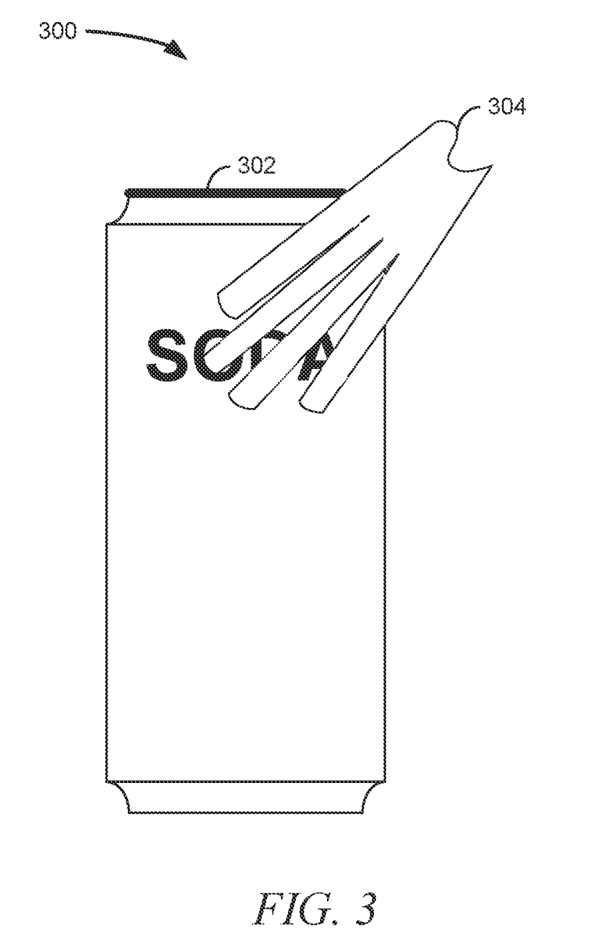
FIG. 3 is an example image of an item that is partially obscured that is to be processed, according to an example embodiment.

FIG. 3 is an example image 300 of an item 302 that is partially obscured that is to be processed, according to an example embodiment. The item 302 is obscured in the example image 300 by a hand 304 of a shopper. As the item 302 is partially obscured, the item 302 may be difficult for a machine vision process to identify the item 302. A determination may not be as accurate as it otherwise would be but for the obscuring hand 304. For example, two brands of soda may have very similar can appearances. Thus, additional information that provides context, such as a location within a store, shopping history that reveals product preferences, and the like can inform the decision-making process for item identification to significantly improve item recognition. As a result, other processes that utilize product identification data, such as frictionless checkout where a customer just grabs products they want in a store and leaves, customer shopping behavior monitoring, shrinkage reduction systems, and the like have improved performance.

As shoppers move around a store they are tracked in some embodiments as described above. For each shopper there may be a key that points to a historical log of the items they have purchased, which may be referred to as a customer identifier, customer loyalty identifier, maybe even a known customer phone number. Cameras capture images as shoppers pick up and put down items. When someone picks up an item an image crop of the item they are holding may be sent to a deep learning model. This model may return probabilities for a number of items, even each item in the store. The highest probability is the item that is predicted that the shopper is holding. Some embodiments include set threshold value for high confidence that an item is a truly a correct prediction. In some embodiments, if a prediction is below this threshold, or not a second threshold amount greater than a probability of being another item, context information may then be considered in the item recognition. However, some other embodiments may always utilized contextual information.

When contextual information is used, the contextual information may include the shopper's historical purchases, figure out what items the shopper usually purchases, and which items the shopper never purchases based on features such as time of day, store location, day of the week, and what items are currently in their cart. This summary may then be compared in some embodiments against the top recommendations from the deep learning model and match-making is done to ensure that the deep learning models confidence in prediction is maximized such that the item the shopper is holding is identified with great confidence. An example of such a solution is described in FIG. 4.

Figure 4:
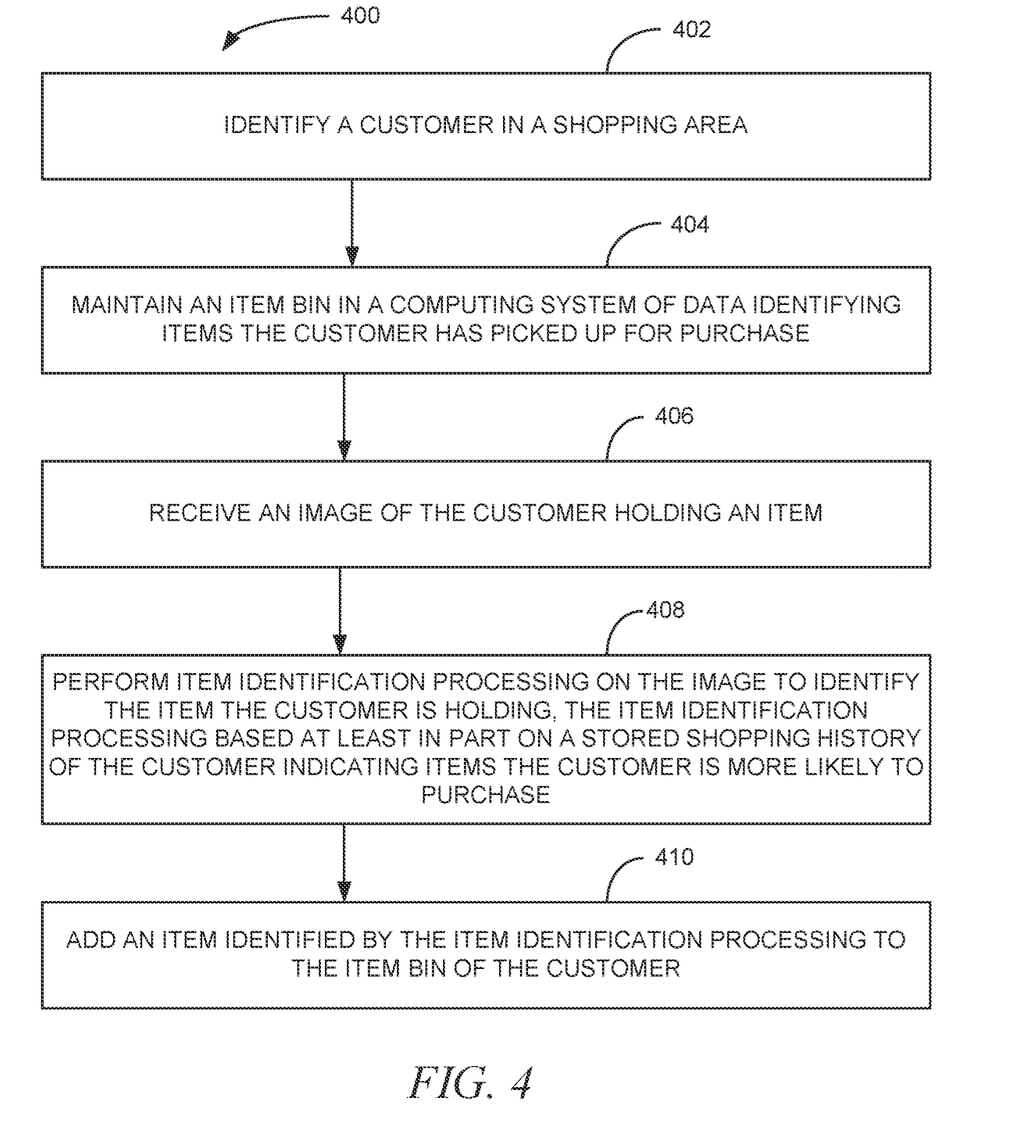
FIG. 4 is a block flow diagram of a method, according to an example embodiment.

FIG. 4 is a block flow diagram of a method 400, according to an example embodiment. The method 400 is an example of a method that may be performed on the system 100 of FIG. 1 to identify items a customer picks up in a shopping area.

The method 400 includes identifying 402 a customer in a shopping area and maintaining 404 an item bin in a computing system of data identifying items the customer has picked up for purchase. The method 400 further includes receiving 406 an image of the customer holding an item and performing 408 item identification processing on the image to identify the item the customer is holding. The item identification processing is typically based at least in part on a stored shopping history of the customer indicating items the customer is more likely to purchase. The method 400 may then add 410 an item identified by the item identification processing to the item bin of the customer. The method 400 may also be performed with regard to items picked up from a cart of the customer to identify items removed from the cart. However, the method 400 would also take into account contextual data of items already present in the item bin of the customer.

In some embodiments of the method 400, the item identification processing based at least in part on the stored shopping history of the customer indicating items the customer is more likely to purchase includes a multi-dimensional model with data representing a customer likelihood to purchase certain items and to not purchase other items. In some such embodiments, the model further includes location, day of the week, and time of day factors indicating a customer likelihood to purchase or not to purchase certain items. In these and some other embodiments of the method 400, the model is utilized by the item identification processing to obtain a weight with regard to each of one or more item possibilities identified by the image processing. This weight may be with regard to item possibility that is a factor for the item identification processing to determine an identity of the item the customer is holding. In yet another embodiment, a model is generated for each of a plurality of customers by processing customer shopping history data stored in a database with at least one machine learning algorithm, such as a convolutional neural network algorithm.

In some embodiments of the method 400, identifying 402 a customer in a shopping area includes capturing an image of at least a portion of a shopping area and performing a person recognition function on the image to obtain a customer identity.

Figure 5:
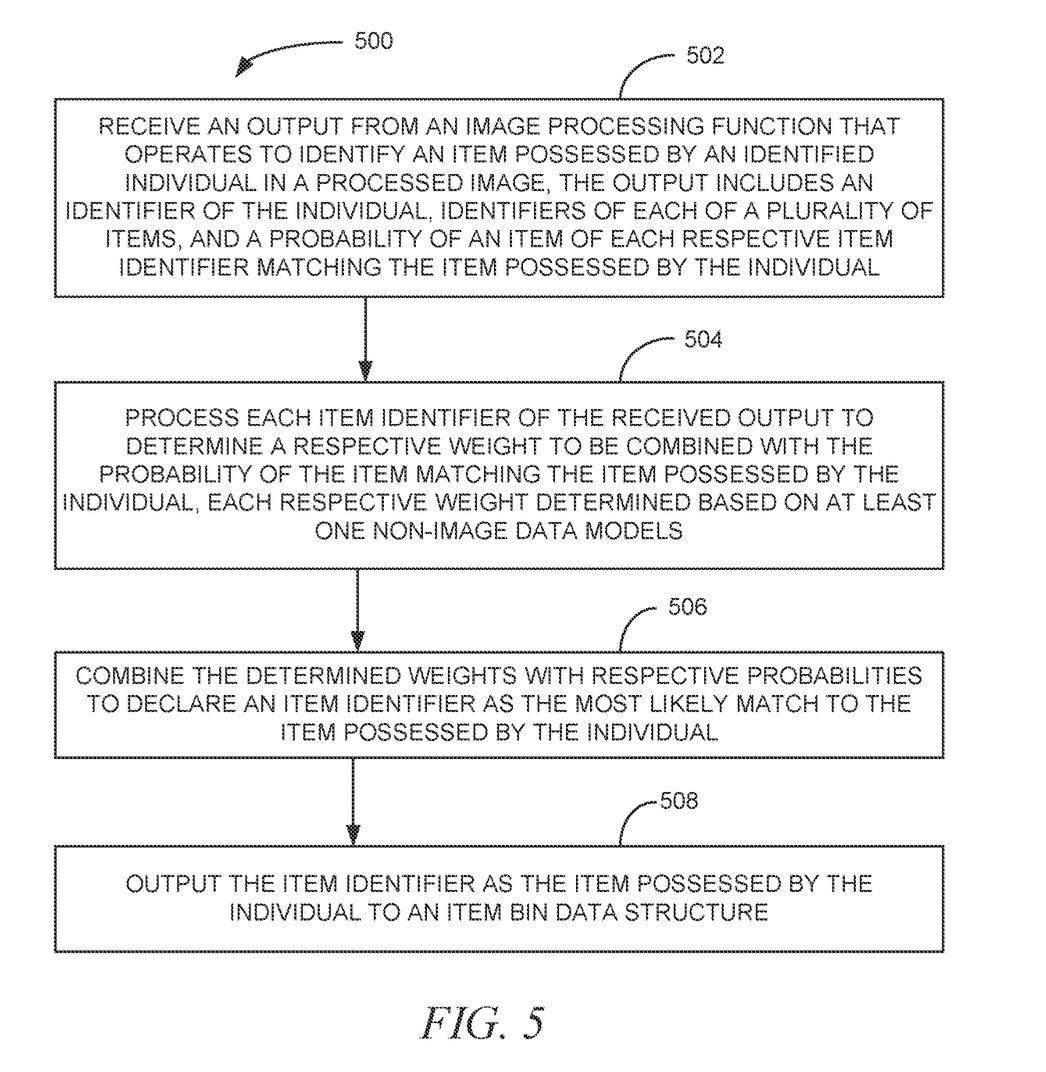
FIG. 5 is a block flow diagram of a method, according to an example embodiment.

FIG. 5 is a block flow diagram of a method 500, according to an example embodiment. The method 500 is an example of a method that may be performed on the system 100 of FIG. 1 to identify items a customer picks up in a shopping area.

The method 500 includes receiving 502 an output from an image processing function that operates to identify an item possessed by an identified individual in a processed image. The received 502 output may include an identifier of the individual, identifiers of each of a plurality of items, and a probability of an item of each respective item identifier matching the item possessed by the individual. The method 500 further includes processing 504 each item identifier of the received 502 output to determine a respective weight to be combined with the probability of the item matching the item possessed by the individual, each respective weight determined based on at least one non-image data models. The method may then combine 506 the determined weights with respective probabilities to declare an item identifier as the most likely match to the item possessed by the individual. The item identifier may then be output 508 as the item possessed by the individual to an item bin data structure.

In some embodiments of the method 500, the processing 504 of each item identifier of the received 502 output to determine a respective weight to be combined 506 with the probability of the item matching the item possessed by the individual includes identifying at least one model based on the identifier of the individual, the model generated from data representative of historic item selection behavior of the identified individual. Such embodiments further include applying each of the at least one identified models with regard to each item identifier of the received output to determine the respective weights. In some such embodiments, data representative of historic item selection behavior of the identified individual includes a data representation of items purchased by the identified customer. This data representation of items purchased by the identified customer may further include at least one of day of the week and time data of when a respective product has been purchased.

In some further embodiments of the method 500, the received 507 output of the image processing function further includes data identifying an area represented in the processed image and the at least one non-image data model includes an item location model including data associating item identifiers to respective locations within a facility. In such embodiments, the processing 504 of each item identifier of the received output to determine a respective weight to be combined with the probability of the item matching the item possessed by the individual includes applying the item location model with regard to each item identifier of the received output and the data identifying the area represented in the processed image to determine the respective weights.

Figure 6:
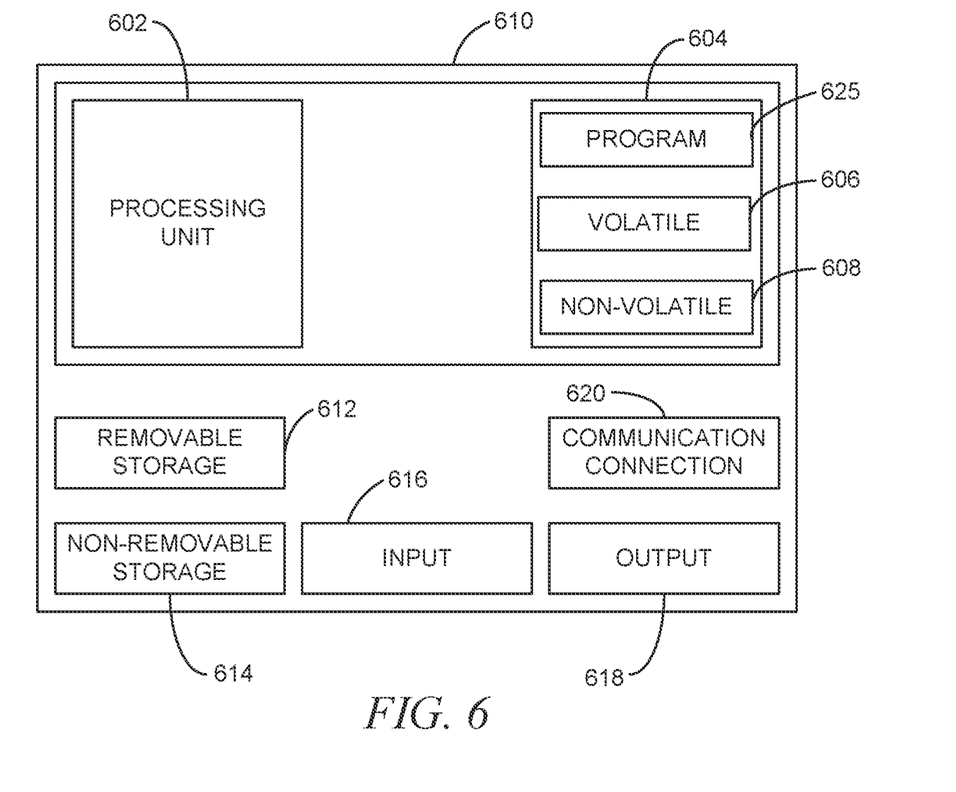
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. One example computing device in the form of a computer 610, may include a processing unit 602, memory 604, removable storage 612, and non-removable storage 614. Although the example computing device is illustrated and described as computer 610, the computing device may be in different forms in different embodiments. For example, the computing device may instead be a smartphone, a tablet, smartwatch, or other computing device including the same or similar elements as illustrated and described with regard to FIG. 6. Devices such as smartphones, tablets, and smartwatches are generally collectively referred to as mobile devices. Further, although the various data storage elements are illustrated as part of the computer 610, the storage may also or alternatively include cloud-based storage accessible via a network, such as the Internet.

Returning to the computer 610, memory 604 may include volatile memory 606 and non-volatile memory 608. Computer 610 may include or have access to a computing environment that includes a variety of computer-readable media, such as volatile memory 606 and non-volatile memory 608, removable storage 612 and non-removable storage 614. Computer storage includes random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 610 may include or have access to a computing environment that includes input 616, output 618, and a communication connection 620. The input 616 may include one or more of a touchscreen, touchpad, mouse, keyboard, camera, one or more device-specific buttons, one or more sensors integrated within or coupled via wired or wireless data connections to the computer 610, and other input devices. The computer 610 may operate in a networked environment using a communication connection 620 to connect to one or more remote computers, such as database servers, web servers, and other computing device. An example remote computer may include a personal computer (PC), server, router, network PC, a peer device or other common network node, or the like. The communication connection 620 may be a network interface device such as one or both of an Ethernet card and a wireless card or circuit that may be connected to a network. The network may include one or more of a Local Area Network (LAN), a Wide Area Network (WAN), the Internet, and other networks. In some embodiments, the communication connection 620 may also or alternatively include a transceiver device, such as a BLUETOOTH® device that enables the computer 610 to wirelessly receive data from and transmit data to other BLUETOOTH® devices.

Computer-readable instructions stored on a computer-readable medium are executable by the processing unit 602 of the computer 610. A hard drive (magnetic disk or solid state), CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
   performing item identification processing on a received image to identify an item the customer is holding, the item identification processing based at least in part on a stored shopping history of the customer indicating items the customer is more likely to purchase the item identification processing including applying a multi-dimensional model with data representing a customer likelihood to purchase certain items and to not purchase other items; and
   adding an item identified by the item identification processing to an item bin of the customer, the item bin of the customer storing data identifying items the customer has picked up for purchase.

2. The method of claim 1, wherein the data representing the customer likelihood to purchase certain items and to not purchase other items is, at least in part, a stored shopping history of the customer.

3. The method of claim 1, wherein the model further includes location, day of the week, and time of day factors indicating a customer likelihood to purchase or not to purchase certain items.

4. The method of claim 1, wherein the model is utilized by the item identification processing to obtain a weight with regard to each of one or more item possibilities identified by the image processing, wherein the weight with regard to item possibility is a factor for the item identification processing to determine an identity of the item the customer is holding.

5. The method of claim 1, wherein a model is generated for each of a plurality of customers by processing customer shopping history data stored in a database with at least one machine learning algorithm.

6. The method of claim 5, wherein the machine learning algorithm is a convolutional neural network algorithm.

7. The method of claim 1, wherein identifying a customer in a shopping area includes:
   capturing an image of at least a portion of a shopping area; and
   performing a person recognition function on the image to obtain a customer identity.

8. The method of claim 1, wherein receiving the image of the customer holding the item includes receiving a cropped image that has been cropped to focus item identification processing on an image portion of a larger image that includes the item.

9. A system comprising:
   a computer processor;
   a memory device; and
   instructions stored on the memory device that are executable by the computer processor to perform data processing activities comprising:
      performing item identification processing on a received image to identify an item the customer is holding, the item identification processing based at least in part on a stored shopping history of the customer indicating items the customer is more likely to purchase the item identification processing including applying a multi-dimensional model with data representing a customer likelihood to purchase certain items and to not purchase other items; and
      adding an item identified by the item identification processing to an item bin of the customer, the item bin of the customer storing data identifying items the customer has picked up for purchase.

10. The system of claim 9, wherein the data representing the customer likelihood to purchase certain items and to not purchase other items is, at least in part, a stored shopping history of the customer.

11. The system of claim 9, wherein the model further includes location, day of the week, and time of day factors indicating a customer likelihood to purchase or not to purchase certain items.

12. The system of claim 9, wherein the model is utilized by the item identification processing to obtain a weight with regard to each of one or more item possibilities identified by the image processing, wherein the weight with regard to item possibility is a factor for the item identification processing to determine an identity of the item the customer is holding.

13. The system of claim 9, wherein a model is generated for each of a plurality of customers by processing customer shopping history data stored in a database with at least one machine learning algorithm.

14. The system of claim 13, wherein the machine learning algorithm is a convolutional neural network algorithm.

15. The system of claim 9, wherein identifying a customer in a shopping area includes:
   capturing an image of at least a portion of a shopping area; and
   performing a person recognition function on the image to obtain a customer identity.

16. The system of claim 9, wherein receiving the image of the customer holding the item includes receiving a cropped image that has been cropped to focus item identification processing on an image portion of a larger image that includes the item.

* * * * *